(12) United States Patent
Boswell et al.

(10) Patent No.: US 10,248,130 B2
(45) Date of Patent: Apr. 2, 2019

(54) SYSTEM AND METHOD FOR UNDERGROUND MACHINE LOCATION DETECTION

(71) Applicant: Caterpillar Inc., Peoria, IL (US)

(72) Inventors: Nigel Peter Boswell, Ferny Grove (AU); David Smith, Upper Coomera (AU)

(73) Assignee: Caterpillar Inc., Deerfield, IL (US)

( * ) Notice: Subject to any disclaimer, the term of this patent is extended or adjusted under 35 U.S.C. 154(b) by 57 days.

(21) Appl. No.: 15/682,822

(22) Filed: Aug. 22, 2017

(65) Prior Publication Data

US 2019/0064820 A1 Feb. 28, 2019

(51) Int. Cl.
*G01C 21/00* (2006.01)
*G05D 1/02* (2006.01)
*B60P 3/14* (2006.01)

(52) U.S. Cl.
CPC ............. *G05D 1/024* (2013.01); *B60P 3/14* (2013.01); *B60W 2550/14* (2013.01); *G05B 2219/45004* (2013.01); *G05D 2201/021* (2013.01)

(58) Field of Classification Search
CPC ....... G05D 1/024; B60P 3/14; B60W 2550/14
See application file for complete search history.

(56) References Cited

U.S. PATENT DOCUMENTS

| | | | | |
|---|---|---|---|---|
| RE28,556 E | * | 9/1975 | Swoager | E21D 20/003 |
| | | | | 405/299 |
| 4,312,540 A | * | 1/1982 | Thompson | E21C 27/24 |
| | | | | 198/313 |
| 7,926,583 B2 | * | 4/2011 | Newnam | E02F 3/76 |
| | | | | 172/447 |

* cited by examiner

*Primary Examiner* — Adam M Alharbi
(74) *Attorney, Agent, or Firm* — Timothy A. Parker

(57) ABSTRACT

A machine operating at an underground mine site is provided. The machine includes an engine, a frame, and a vision assembly. The vision assembly is configured to generate a vision feed of a portion of a roof of the mine site. The roof of the mine site has a plurality of bolts arranged in a predefined pattern. The vision assembly is configured to capture at least a portion of the predefined pattern of bolts based on a field of view of the vision assembly. A controller is communicably coupled to the vision assembly. The controller is configured to receive the vision feed of the portion of the roof of the mine site. The controller is configured to compare the vision feed with the predefined pattern of bolts. The controller is configured to determine a current position of the machine at the mine site based on the comparison.

20 Claims, 4 Drawing Sheets

SYSTEM AND METHOD FOR UNDERGROUND MACHINE LOCATION DETECTION

TECHNICAL FIELD

The present disclosure relates to a machine operating at an underground mine site, and more particularly to a system and method for detection of a location of the machine at the underground mine site.

BACKGROUND

Underground mining machines, such as trucks and loaders, operate at an underground mine site. These machines may include autonomous, semi-autonomous, or manned machines. However, due to the lack of GPS availability in these environments, accurate perception and navigation for such machines may be significantly more difficult than those for surface applications.

Existing solutions may include providing additional sensors or hardware on these machines to estimate or detect a location of the machine while operating underground. However, such solutions may be prohibitively expensive, may require large amounts of additional infrastructure, or may fail to offer acceptable levels of accuracy and performance. This in turn may affect an overall productivity and efficiency of the system.

Hence, there is a need to provide an improved system and method for location detection of these underground machines.

SUMMARY OF THE DISCLOSURE

In one aspect of the present disclosure, a machine operating at an underground mine site is provided. The machine includes an engine, a frame, and a vision assembly mounted on the machine. The vision assembly is configured to generate a vision feed of a portion of a roof of the mine site. The roof of the mine site has a plurality of bolts arranged in a predefined pattern. The vision assembly is configured to capture at least a portion of the predefined pattern of bolts based on a field of view of the vision assembly. A controller is communicably coupled to the vision assembly. The controller is configured to receive the vision feed of the portion of the roof of the mine site. The controller is configured to compare the vision feed with the predefined pattern of bolts. The controller is configured to determine a current position of the machine at the mine site based on the comparison.

In another aspect of the present disclosure, a control system for determining a current position of a machine operating at an underground mine site is provided. The control system includes a vision assembly mounted on the machine. The vision assembly is configured to generate a vision feed of a portion of a roof of the mine site. The roof of the mine site has a plurality of bolts arranged in a predefined pattern. The vision assembly is configured to capture at least a portion of the predefined pattern of bolts based on a field of view of the vision assembly. A controller is communicably coupled to the vision assembly. The controller is configured to receive the vision feed of the portion of the roof of the mine site. The controller is configured to compare the vision feed with the predefined pattern of bolts. The controller is configured to determine a current position of the machine at the mine site based on the comparison.

In yet another aspect of the present disclosure, a method for determining a current position of a machine operating at an underground mine site is provided. The method includes capturing, by a vision assembly, a vision feed of a portion of a roof of the mine site such that at least a portion of a predefined pattern of bolts present on the roof of the mine site are captured by the vision assembly. The method includes receiving, by a controller, the vision feed of the portion of the roof of the mine site. The method includes comparing, by the controller, the vision feed with the predefined pattern of bolts. The method includes determining, by the controller, the current position of the machine at the mine site based on the comparison.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
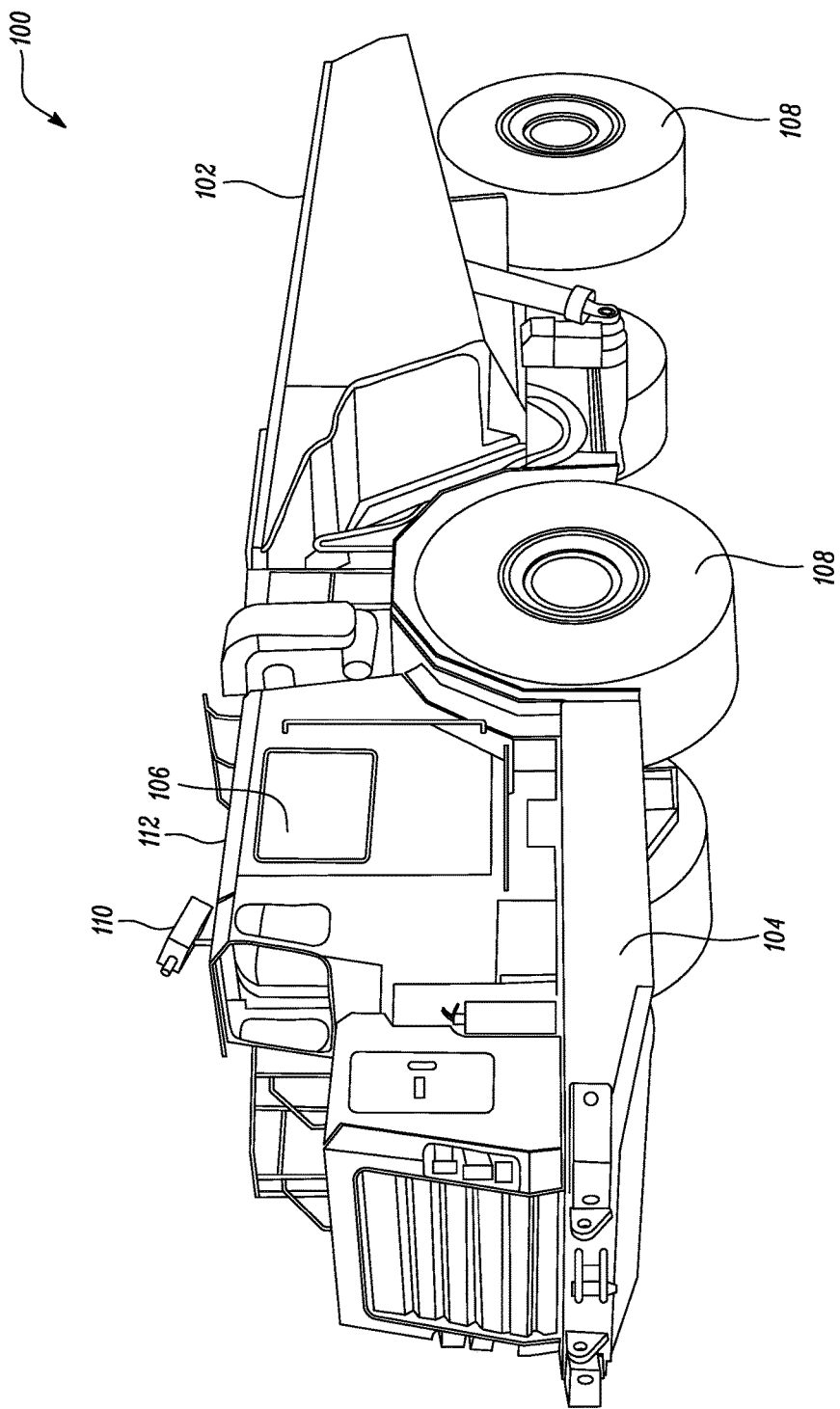
FIG. 1 is a perspective view of an exemplary machine, according to various concepts of the present disclosure.

Referring to FIG. 1, an exemplary machine 100 is illustrated. The machine 100 is embodied as a mining truck for an underground mine site 200 (see FIG. 2). The machine 100 includes a truck body 102 pivotably attached to a frame 104 of the machine 100. Although the machine 100 is illustrated as the mining truck, those skilled in the art will appreciate that the machine 100 may be any other known underground machine, for example, a loader, a shearer, and so on.

The machine 100 has an operator cabin 106 housing controls to operate the machine 100. Wheels 108 are provided on the machine 100 for mobility. During operation, the truck body 102 pivots between a first position and a second position. This movement of truck body 102 is controlled by one or more actuators.

The truck body 102 is configured to be loaded with material, and the machine 100 transports the material from one location to another within the mine site 200. For example, the truck body 102 may be loaded with the material when the truck body 102 is in the first position. After moving to the dumping location, the truck body 102 is actuated to move to the second position for dumping the material.

A vision assembly 110 is provided on the machine 100. In one example, the vision assembly 110 is provided on a roof 112 of the operator cabin 106 of the machine 100. The vision assembly 110 is positioned such that a field of view of the vision assembly 110 has minimum or no obstructions. The vision assembly 110 is mounted at a high location from ground surface and is oriented to face upwards or at angle such that the vision assembly 110 points towards a roof 202 (see FIG. 2) of the mine site 200. The vision assembly 110 may be embodied as an image capturing device such as a camera, a video recorder, a camcorder, and so on. Alternatively, the vision assembly 110 may include a LIDAR system. The vision assembly 110 may generate a two-dimensional or three-dimensional vision feed of a portion of the roof of the mine site 200. The vision feed may include images, a series of images, a video feed, or a map of the mine site 200 as sensed by the LIDAR system, based on the type of the vision assembly 110. A position of vision assembly 110 and angle of orientation thereof may be fixed and known to the system.

Figure 2:
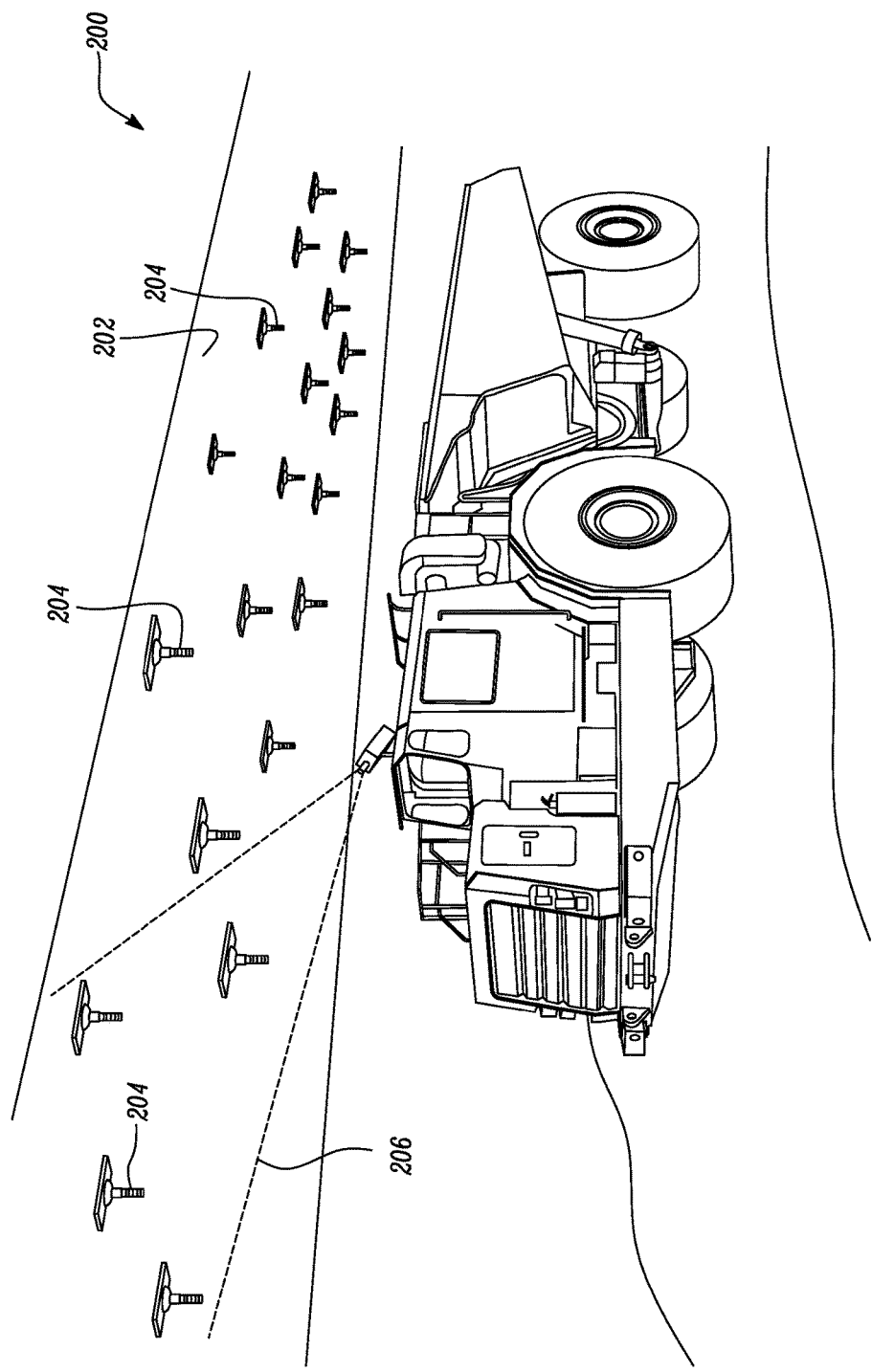
FIG. 2 is a perspective view of the machine of FIG. 1 operating at the underground mine site, according to various concepts of the present disclosure.

Referring to FIG. 2, the vision assembly 110 captures the vision feed of at least a portion of a pattern of bolts 204 provided on the roof 202 of the mine site 200. The bolts 204 are provided on the roof 202 of the mine site 200 in a predefined and unique pattern. It should be noted that the term "predefined" used herein to describe the arrangement of the bolts 204 on the roof of the mine site 200 means that the bolts 204 are previously installed, and that the arrangement or pattern of installation of the bolts 204 is known by the system. This pattern information is prestored in a database 304 (see FIG. 3). Further, the pattern of the bolts 204, hereinafter referred as predefined pattern of bolts 204, provides a unique constellation upon which a localization map may be built by the system. Based on the position of the machine 100 at the mine site 200, the vision assembly 110 captures the portion of the predefined pattern of bolts 204, for example three or more bolts 204 of the predefined pattern of bolts 204 that fall within a field of view 206 of the vision assembly 110.

The bolts 204 that are captured in the vision feed are positioned either directly above the machine 100 or within a defined proximity of the machine 100, say within a radius of approximately 5 m of the machine 100. Further, the number of bolts 204 captured in the vision feed may depend of the field of view 206 of the vision assembly 110. It should be noted that the bolts 204 are provided in the predefined pattern on the roof 202 of the mine site 200. The bolts 204 assist in stabilizing the roof 202. The bolts 204, once installed, provide a unique and easily identifiable reference pattern. In some embodiments, the predefined pattern of bolts 204 is preferably semi-random in nature, and/or may be driven by the structural requirements of the mine site 200. The bolts 204 are positioned in a such a manner that the bolts 204 are easily captured by the vision assembly 110 atop the machine 100.

Based on the position of the machine 100 at the mine site 200, the vision assembly 110 captures the vision feed of the portion of the predefined pattern of bolts 204, that is, the vision feed includes at least some of the multiple bolts 204 that are arranged on the roof 202. For example, the vision assembly 110 may capture three or more bolts 204 from the predefined pattern of bolts 204. In some cases, a light source (not shown) may also be provided on the roof 112 of the machine 100 or elsewhere on the machine 100, such that the light source casts light on the field of view 206 of the vision assembly 110 so that the vision feed may be captured under optimum lighting conditions.

Figure 3:
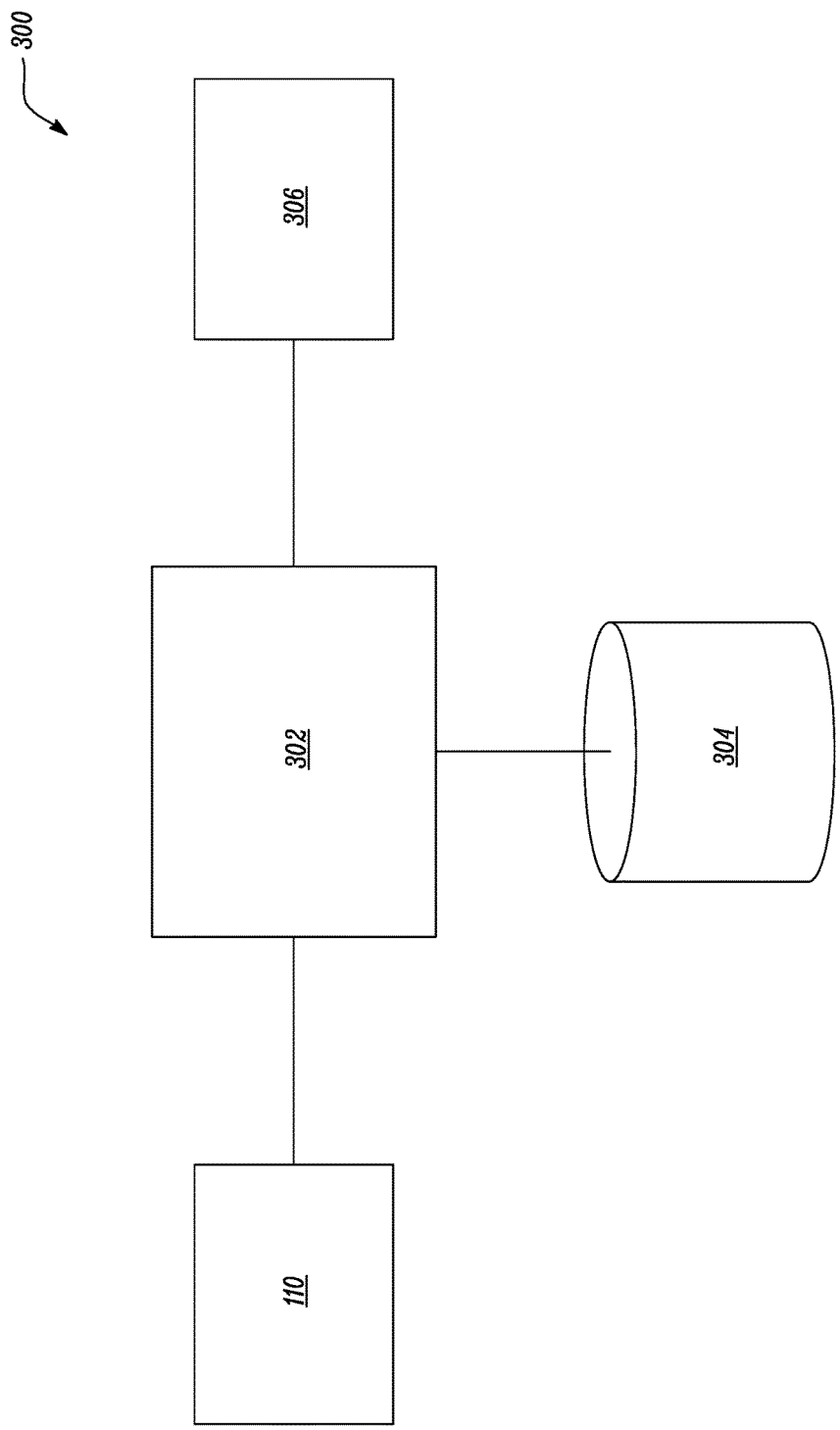
FIG. 3 is a block diagram of a control system associated with machine, according to various concepts of the present disclosure.

Referring to FIG. 3, a control system 300 for determining the location or current position of the machine 100 at the mine site 200 is illustrated. The control system includes a controller 302 coupled to the vision assembly 110. The controller 302 is configured to receive the vision feed of the portion of the predefined pattern of bolts 204 captured by the vision assembly 110. The controller 302 compares the vision feed of the pattern bolts 204 with the predefined pattern of bolts 204.

More particularly, the controller 302 may perform image analyses on the vision feed to identify the bolts 204 and detect the pattern of bolts 204 in the vision feed. For example, for each frame of the vision feed, the controller 302 may segment the vision feed into a number of windows and may search for the bolts 204 in each of the windows, successively moving across the entire frame. The controller 302 may iteratively scan the vision feed for detecting the bolts 204 in the captured vision feed. Further, after identifying or detecting the bolts 204 in the vision feed, the controller 302 compares the pattern of the bolts 204 in the vision feed with the predefined pattern of bolts 204. Based on the number of the bolts 204 captured in the vision feed, the pattern of the said bolts 204 may be a subset of the predefined pattern of bolts 204.

The controller 302 compares the pattern of the bolts 204 in the vision feed with the predefined pattern of bolts 204. In one example, the predefined pattern of bolts 204 may be known to the system and may be pre-stored in the database 304 that is coupled to the controller 302. The database 304 may include any known data storage medium or repository for storage of data related to the predefined pattern of bolts 204. The controller 302 may access the database 304 and retrieve the predefined pattern of bolts 204 for comparison with the bolts 204 identified in the vision feed.

Further, the controller 302 determines the position of the machine 100 at the mine site 200 based on the comparison. The predefined pattern of the bolts 204 is stored in the database 304 relative to the overall site map so that the patterns of the bolts 204 detected in the vision feed identify a location within the mine site 200.

For example, the database 304 may include a pre-calibrated dataset that provides a mapping or correlation between the pattern of the bolts 204 detected in the vision feed and the predefined pattern of the bolts 204. This dataset may include pre-stored position information of the machine 100 within the mine site 200 based on the pattern of the bolts 204 as viewable from that position. Accordingly, after detecting and comparing the bolts 204 identified in the vision feed with the predefined pattern of bolts 204, the controller 302 may map and determine the position of the machine 100 at the mine site 200. The controller 302 may consider various parameters while estimating the position of the machine 100 based on the analyses of the vision feed, for example, number of bolts 204 captured, angle of capturing the vision feed, angle and position of mounting of the vision assembly 110, pattern of the bolts 204 detected in the vision feed relative to the known predefined pattern of the bolts 204, orientation of the bolts 204, portion or shape of the bolts 204 as in the vision feed, and so on. The controller 302 may compare the detected bolts 204 in the vision feed with known profiles of the bolts 204 to determine the relative position of the machine 100 within the mine site 200.

Further, the controller 302 is shown coupled to an output device 306 such as a display unit, a screen, a monitor, a touchscreen, and so on. The output device 306 displays a notification to an operator of the determined position of the machine 100 at the mine site 200. In one example, co-ordinates of the machine 100 relative to the mine site 200 may be displayed. In another example, the location of the machine 100 within the mine site 200 may be displayed on a schematic depiction of the site map. Alternatively, the display of the determined location of the machine 100 may vary without any limitation. In some embodiments, a perception based system including inertial measurement units, a gyroscope, and other sensors may be provided on the machine 100 to verify that the location of the machine 100 as determined by the controller 302. Further, in some cases, the location of the machine 100, as determined by the controller 302, may be sent off-board via a suitable communication network, for example Wi-Fi, to be displayed or used for decision support in a mine office. In one embodiment, the perception based system may be used to augment and assist in the generation of a localization solution of the controller 302. Additionally, vehicle based odometry such as, speed and steering angles may be used to augment and assist in the generation of the localization solution.

The controller 302 may be a microprocessor or other processor as known in the art. The controller 302 may embody a single microprocessor or multiple microprocessors to perform the operations described above. Numerous commercially available microprocessors may be configured to perform the functions of the controller 302. A person of ordinary skill in the art will appreciate that the controller 302 may additionally include other components and may also perform other functions not described herein. Additionally, the control system 300 may be either be contained in a single hardware unit or based on the requirements, separate modules may perform the functionality of the control system 300.

INDUSTRIAL APPLICABILITY

Figure 4:
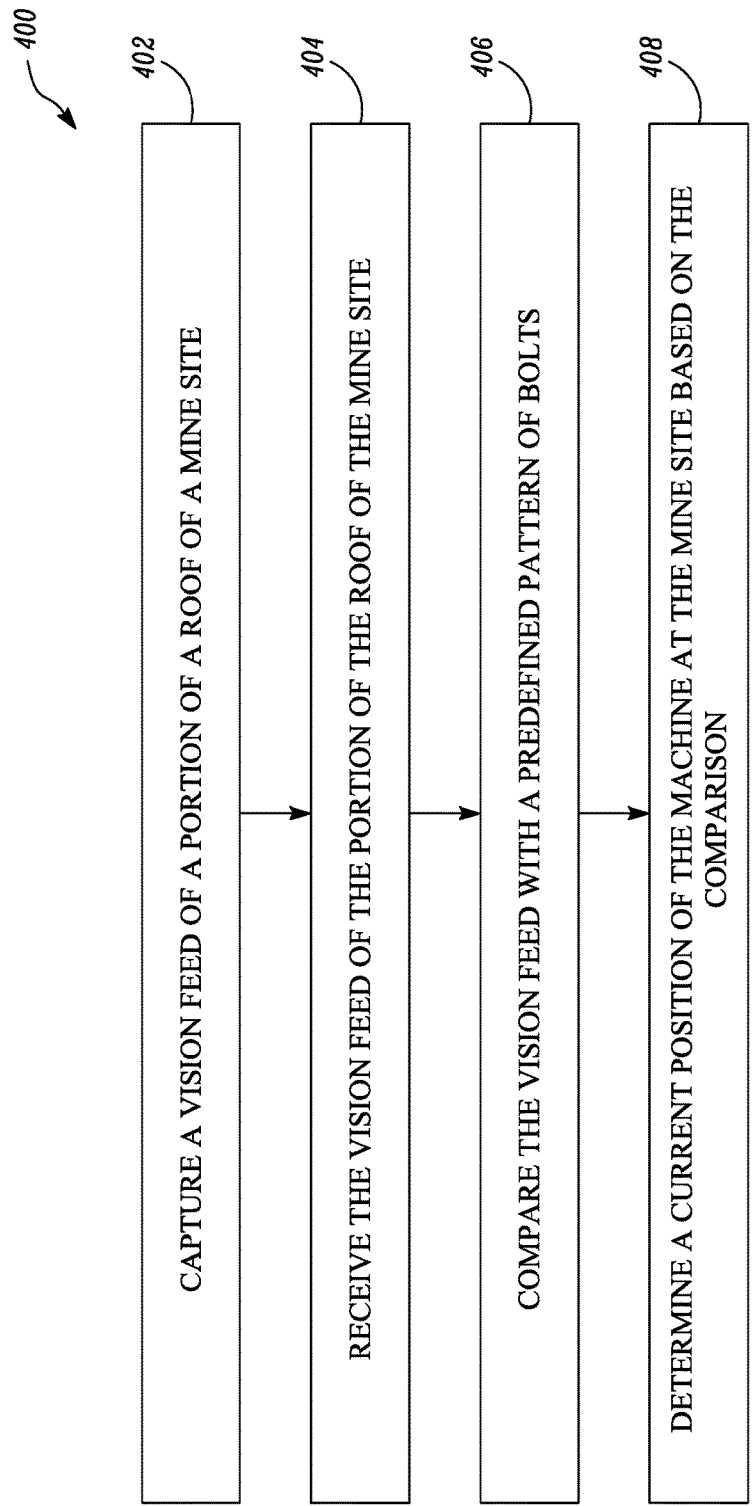
FIG. 4 is a flowchart of a method for determining a current position of the machine operating at the underground mine site, according to various concepts of the present disclosure.

The present disclosure relates to the system 300 and method 400 for determining the location of the machine 100 at the underground mine site 200. Referring to FIG. 4, at step 402, the vision assembly 110 captures the vision feed of the portion of the roof 202 of the mine site 200. At step 404, the controller 302 receives the vision feed of the portion of the roof 202 of the mine site 200. At step 406, the controller 302 compares the vision feed with the predefined pattern of bolts 204. At step 408, the controller 302 determines the current position of the machine 100 at the mine site 200 based on the comparison.

The system offers a robust and cost-effective means to determine the location of the machine 100 at the mine site 200. Further, since the bolts 204 are present on the roof 202 of the mine site 200, the vision assembly 110 and the controller 302 require scanning and processing only of relevant bolt pattern data such that the bolts 204 are always located on the roof 202 of the mine site 200 that is above the machine 100. This processing of selected data requires scanning or monitoring of a significantly smaller area, using less operational resources and saving more time.

The vision assembly 110 is a low-cost hardware that may be used to identify the location of the machine 100 by capturing the vision feed of the predefined pattern of bolts 204. The system does not require any additional expensive sensor elements, reducing and overall cost of the system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A machine operating at an underground mine site, the machine comprising:
   an engine;
   a frame;
   a vision assembly mounted on the machine, the vision assembly configured to generate a vision feed of a portion of a roof of the mine site, wherein the roof of the mine site has a plurality of bolts arranged in a predefined pattern, and wherein the vision assembly is configured to capture at least a portion of the predefined pattern of bolts based on a field of view of the vision assembly; and
   a controller communicably coupled to the vision assembly, the controller configured to:
      receive the vision feed of the portion of the roof of the mine site;
      compare the vision feed with the predefined pattern of bolts; and
      determine a current position of the machine at the mine site based on the comparison.

2. The machine of claim 1, wherein the vision assembly is any one of a two-dimensional vision image capturing device, a three-dimensional image capturing device, or a LIDAR system.

3. The machine of claim 1, wherein the vision assembly is positioned on a roof of the machine.

4. The machine of claim 1 further comprising a light source provided on the machine, the light source configured to project light on the field of view of the vision assembly.

5. The machine of claim 1 further comprising an output device coupled to the controller, wherein the controller is configured to provide a notification of the determined current position of the machine through the output device.

6. The machine of claim 1, wherein the vision feed captured by the vision assembly includes at least three or more bolts from the predefined pattern of bolts.

7. The machine of claim 1 further comprising a perception based system connected to the controller.

8. The machine of claim 1, wherein the determination of the current position of the machine by the controller includes:
   detecting bolts in the vision feed; and
   comparing the detected bolts in the vision feed with the predefined pattern of bolts on the roof of the mine site.

9. The machine of claim 8, wherein the controller is configured to perform image analyses on the vision feed for the detection and comparison steps.

10. A control system for determining a current position of a machine operating at an underground mine site, the control system comprising:
    a vision assembly mounted on the machine, the vision assembly configured to generate a vision feed of a portion of a roof of the mine site, wherein the roof of the mine site has a plurality of bolts arranged in a predefined pattern, and wherein the vision assembly is configured to capture at least a portion of the predefined pattern of bolts based on a field of view of the vision assembly; and
    a controller communicably coupled to the vision assembly, the controller configured to:
       receive the vision feed of the portion of the roof of the mine site;
       compare the vision feed with the predefined pattern of bolts; and
       determine a current position of the machine at the mine site based on the comparison.

11. The control system of claim 10, wherein the vision assembly is any one of a two-dimensional vision image capturing device, a three-dimensional image capturing device, or a LIDAR system.

12. The control system of claim 10, wherein the vision assembly is positioned on a roof of the machine.

13. The control system of claim 10 further comprising a light source provided on the machine, the light source configured to project light on the field of view of the vision assembly.

14. The control system of claim 10 further comprising an output device coupled to the controller, wherein the controller is configured to provide a notification of the determined current position of the machine through the output device.

15. The control system of claim 10, wherein the vision feed captured by the vision assembly includes at least three or more bolts from the predefined pattern of bolts.

16. The control system of claim 10 further comprising a perception based system connected to the controller.

17. The control system of claim 10, wherein the determination of the current position of the machine by the controller includes:
   detecting bolts in the vision feed; and
   comparing the detected bolts in the vision feed with the predefined pattern of bolts on the roof of the mine site.

18. The control system of claim 17, wherein the controller is configured to perform image analyses on the vision feed for the detection and comparison steps.

19. A method for determining a current position of a machine operating at an underground mine site, the method comprising:
   capturing, by a vision assembly, a vision feed of a portion of a roof of the mine site such that at least a portion of a predefined pattern of bolts present on the roof of the mine site are captured by the vision assembly;
   receiving, by a controller, the vision feed of the portion of the roof of the mine site;
   comparing, by the controller, the vision feed with the predefined pattern of bolts; and
   determining, by the controller, the current position of the machine at the mine site based on the comparison.

20. The method of claim 19, wherein the determination of the current position of the machine by the controller includes:
   detecting bolts in the vision feed; and
   comparing the detected bolts in the vision feed with the predefined pattern of bolts on the roof of the mine site.

* * * * *